July 11, 1961      A. D. ROBINSON      2,992,170
GAS ANALYZER
Filed April 9, 1958
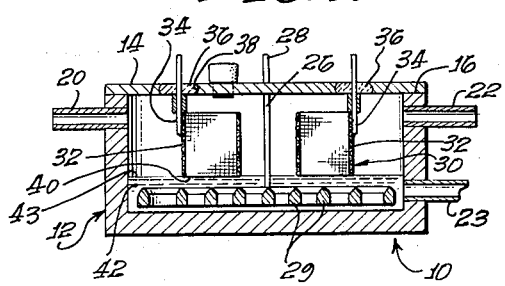
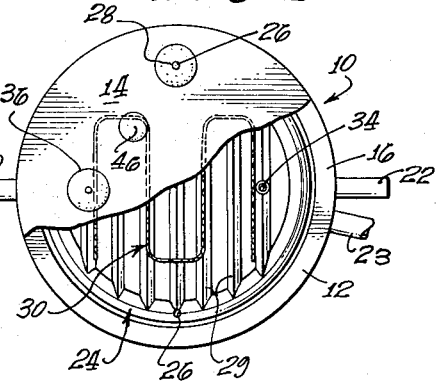
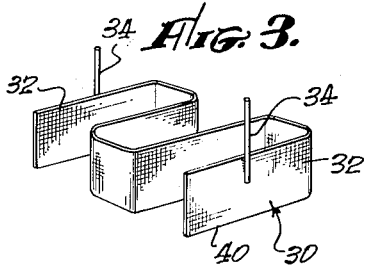
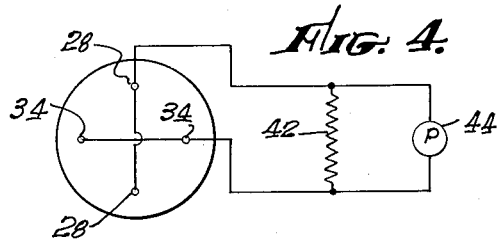
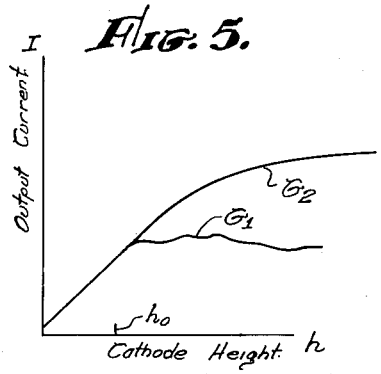
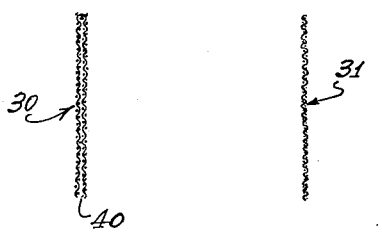
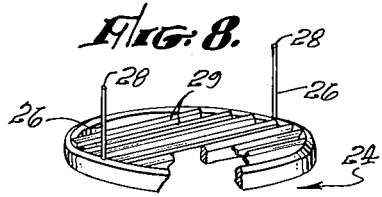
ALFRED D. ROBINSON,
INVENTOR.
BY
ATTORNEY.

United States Patent Office 2,992,170
Patented July 11, 1961

2,992,170
GAS ANALYZER
Alfred D. Robinson, El Monte, Calif., assignor to Research Instrument Corporation, Pasadena, Calif., a corporation of California
Filed Apr. 9, 1958, Ser. No. 727,439
27 Claims. (Cl. 204—1)

This invention relates to improvements in methods and apparatus for detecting and measuring the concentrations of oxygen in the presence of other gases, and, more particularly, to improved methods and apparatus for detecting and measuring small traces of oxygen in the presence of other gases.

Various types of analyzers have been developed in the past for determining the presence and amount of a specific gas in the presence of other gases. One such system employs an electrolytic cell. In such a system an electrode that is in contact with the electrolyte is exposed to the gas mixture which is to be analyzed, and use is made of the current generated by the cell to indicate the amount or concentration of the gas component that is present in the gas mixture and to which the cell is sensitive. Devices of this type are illustrated, for example, in Patent No. 2,651,612, which issued to John F. Haller, September 8, 1953, and Patent No. 2,805,191, which issued to Paul Hersch, September 3, 1957. In both of those devices, current is generated by the cell in an amount that depends upon the concentration of an oxidizing gas to which the cell cathode is exposed. The Hersch cell is used to detect oxygen while Haller states that he can detect chlorine, hydrazine, sulfur dioxide, and certain other gases, but not oxygen.

In the Haller device, the cathode is made of platinum or nickel, while the anode is made of silver, gold, lead, mercury or graphite. In the Haller device, the cathode is in the form of a wire which is wrapped around a porous tube that encircles the anode. In Haller's system, the electrolyte contains a salt solute, such as sodium chloride. In his cell a film of the salt solution on the outside of the porous tubular member is in contact with the platinum electrode. It is essential in his system that the electrolyte be of such a type that it does not chemically attack the cathode.

Whereas Haller discloses the use of silver as an anode and nickel as a cathode, Hersch teaches the advisability of employing either silver or nickel as a cathode and teaches that with such a cathode the anode should be composed of cadmium (Cd), lead (Pb), or an antimony amalgam. The Hersch device also requires that the cathode be inert to the electrolyte.

In the Hersch device, it is required that a part of the cathode be dry, so that a three-phase lineal boundary is formed between the liquid, the cathode, and the oxygen-bearing gas which is undergoing analysis. This boundary extends throughout the length of the cathode. In the device disclosed by Hersch, various combinations of cathode, anode and electrolyte are employed. In an oxygen trace analyzer of the type that is disclosed by Hersch, which is least dissimilar to an embodiment of the present invention that is specifically described below, the electrolyte is in the form of an alkaline solution such as potassium hydroxide (KOH).

According to the present invention, an oxygen analyzer is produced in which a depolarizing metal cathode is completely wetted by the electrolyte. In the best oxygen analyzer found to date, the cathode is made of silver and the electrolyte is composed of potassium hydroxide. In any event, the entire silver cathode is maintained wet with electrolyte and the thickness of the film is maintained sufficiently great to cause oxygen to react with the electrolyte over the entire surface of the cathode throughout the entire range of oxygen concentration over which the cell is employed. However, copper has also proved to be satisfactory, at least under more restricted conditions of operation.

Broadly stated, in accordance with this invention, an oxygen analyzer is produced which employs a depolarizing metal cathode which is substantially entirely wetted with a film of the electrolyte so thick that the cathode is catalytically active in generating current over its entire surface. By maintaining the entire cathode wet with electrolyte, no three-phase boundary is utilized, but use is made of the catalytic reaction at the two-phase boundary between the film and the cathode. The thickness of the film is great enough to permit ions formed by the reaction of oxygen and electrolyte to flow freely in the liquid electrolyte and without saturation of the ion current at any point of the ion current path that is spaced from the cathode. Furthermore, in accordance with this invention, the liquid film is maintained in liquid contact with the body of the mother electrolyte by means of a channel so that the ion flow from the film remains unobstructed by any liquid flow barriers such as are provided by wicks and thin films. In this way ion current saturation of ion current at any such point of the ion current path is precluded. In this way choking of the reaction at the cathode is avoided over its entire surface.

As a result, an oxygen analyzer is produced which is more uniform in response and which yields more nearly reproducible results than any electrolytic oxygen analyzer heretofore available. More particularly, with this oxygen analyzer, many erratic results are substantially eliminated, such as variations in sensitivity and "hysteresis" or "backlash," that might otherwise be produced when high concentrations of oxygen such as 5,000 p.p.m. (part per million) are used and then mixtures with low concentrations of oxygen such as 100 p.p.m. are employed. In addition, and of great importance, is the fact that in accordance with this invention an analyzer is provided that has linear response from zero to a much higher oxygen concentration than has been considered possible heretofore. Various properties of cathode materials and various combinations of cathode, electrolyte and anode materials which may be employed in accordance with this invention, are described hereinafter.

The invention possesses many other advantages and employs, at least in various forms, many other features which will be more readily apparent from a consideration of a number of embodiments of the invention which are described below for illustrative purposes. An electrolytic cell of the type employed in this invention is illustrated in the accompanying drawing in which:

FIG. 1 is a sectional view of an electrolytic cell employed in this invention;

FIG. 2 is a top plan, partially broken away, view of the electrolytic cell of FIG. 1;

FIG. 3 is a perspective view of the cathode employed in this electrolytic cell;

FIG. 4 is a schematic diagram of the analyzer showing the circuit employed;

FIG. 5 is a graph showing how the sensitivity of the cell depends upon the height of the non-immersed portion of the cathode;

FIG. 6 shows a cross-section in greater detail of the cathode of FIGS. 1, 2, and 3;

FIG. 7 shows a detail cross-section of an alternative form of cathode; and

FIG. 8 is a perspective view of the anode of FIGS. 1 and 2.

In the drawings, and particularly in FIGS. 1 and 2, there is illustrated an analyzing, or test, cell embodying this invention. The cell 10 comprises a vessel 12 capped by a cover plate 14 sealingly attached to the upper edge thereof. Adit and exit tubes, or pipes, 20 and 22 respectively, pressfitted into opposite walls of the vessel 12 in the upper portion thereof are employed to flow a gas under test through the compartment.

The cell 10 includes an anode 24 that is spaced slightly above the bottom wall or floor of the vessel 12. The disc is of circular configuration and is spaced slightly from the circular sidewall of the vessel 12. The anode 24 is supported rigidly in the vessel by means of a pair of depending hangers 26 that provide terminals 28 for the anode. The anode is formed by a series of spaced-apart rods 29, or the like, that are tapered in a downwardly diverging direction, to permit any sediment formed at the anode to settle to the bottom of the vessel.

The analyzing cell 10 also includes a cathode 30 that is located directly above the anode. The cathode of this analyzing cell is in the form of a fine mesh screen. The specific cathode 30 illustrated in these drawings is also shown in perspective in FIG. 3 and in cross-section in FIG. 6. As therein indicated, the cathode 30 is formed by bending or folding an elongated strip of the metal wire screen into a compact configuration in which a series of cathode sections 32 are arranged, more or less, in a compact parallel zig-zag configuration. To form the cathode, the strip of screen is folded onto itself longitudinally to form a two-layer strip of double thickness as indicated particularly in FIG. 6. Next the two-layer screen is bent into the zig-zag configuration, as shown, for convenience in emplacement and to increase the sensitivity of the cell per unit of horizontal cross-sectional area of the cell. The cathode 30 is supported within the cell above the anode 24, being rigidly held in place by means of a pair of depending hangers 34 which are sealingly supported in place by means of a pair of insulating bushings 36 firmly secured in apertures 38 in the cover plate 14. As indicated in FIGS. 1 and 2, the screen cathode 30 is mounted with the screen sections 32 transverse to the axis of the tubes 20 and 22. The manner in which the height of the screen is determined is explained more fully hereinafter.

The hangers 34 serve as terminals for the cathode. These hangers 34 are welded, or otherwie securely fastened in electrically conductive relationship to the cathode 30. The use of solder or any other material that might not be inert to the electrolyte in the presence of oxygen is avoided. The hangers 34 are mounted at diametrically opposite points along the axis of the tubes 20 and 22, while the hangers 26 are mounted at diametrically opposite points along a line transverse thereto.

The test cell of this invention utilizes a cathode of special characteristics, and the cathode is used under special operating conditions as described hereinafter. In any event, when using an appropriate cathode 34, in order to prepare the cell for use, a volume of liquid, such as an aqueous solution of potassium hydroxide (KOH), is placed in the vessel 12 in an amount sufficient to completely cover the anode 24 and also the lowermost edge 40 of the cathode, and in some cases, such as when copper is employed as a cathode, the cell is subjected to an aging process before being placed in regular analytical use. An auxiliary tube 23 projecting laterally from the lower part of the cell is connected to a liquid level control system (not shown) in order to maintain the level of the electrolyte constant and thus to compensate for evaporation of water when the cell is used for long periods of time.

The anode terminals 28 are electrically connected together and to one end of a calibrated resistor 42, and the cathode terminals 34 are electrically connected together to the opposite end of the resistor 42. In addition, a potentiometer 44 is connected across the calibrated resistor 42, as shown in FIG. 4. The potentiometer is preferably of the recording type, such as a self-balancing recording potentiometer which employs a pen for writing an inked trace on a circular sheet of recording paper that is rotated at uniform speed by a clock motor.

When the cell is in proper operating condition and connected to the resistor 42 and potentiometer 44, the adit tube 20 is connected by means of suitable tubulation or piping to the source of gas that is under investigation. This source of gas may be a sealed container or it may be part of a system through which gas to be analyzed is flowing. At any rate, a valve connected in the line between the adit tube 20 and the gas source is opened to a degree sufficient to cause gas to flow through the test cell at a suitable regulated speed.

In this cell of FIGS. 1 and 2, due to capillary attraction, all of the portion of the cathode that lies above the level of the electrolyte is covered by a film of the electrolyte. Accordingly, with this invention a film of electrolyte prevents direct contact of the gas with the cathode. The only test gas that contacts the cathode is that which diffuses through the electrolyte to the cathode. If the test gas flowing through the cell contains oxygen, some of the oxygen diffuses through the electrolyte film to the cathode and there reacts catalytically with the electrolyte, causing an electric current to flow between the cathode and the anode. This current flows through the calibrated resistor 42, thereby producing a voltage across this resistor which corresponds to the partial pressure of the oxygen present in the test gas, or, in other words, to the concentration of oxygen in the test gas.

This invention is based partly upon the discovery that in an electrolytic cell of the type described, the current produced by the cell when a sample containing a fixed percentage of oxygen flows through the cell, is not accurately reproducible and below saturation unless the entire surface of the cathode capable of being catalytically active is actually acting catalytically, while the measurement is being made. To maintain the cathode acting catalytically over its entire area, the entire cathode is maintained visibly wet. In this way only a two-phase boundary is provided at which the catalytic reaction occurs. Furthermore, the thickness of the film is maintained sufficiently great to permit ions to be formed at all parts of the surface and to flow freely to the mother electrolyte beneath the cathode. The terms "thick film" and "thin film" are sometimes employed hereinafter to distinguish between a film that covers only a catalytically acting area, and one that covers part of the cathode that is not acting catalytically though inherently capable of doing so. It is not only necessary that the cathode be wet but that the electrolyte film be sufficiently thick to permit ions to flow through it rapidly enough to permit the reaction to occur catalytically over the entire surface area of the cathode. The second discovery is that when the entire cathode is catalytically active, the current output of the electrolytic cell is substantially proportional to the height of that part of the cathode which projects above the upper surface of the electrolyte. The discovery involves the fact that the operating range of the electrolytic cell is greatly increased by use of unobstructed liquid flow channels that leads from the film to the mother electrolyte. Such channels have sufficient cross-sectional area to preclude the possibility of ion current saturation occurring in them by virtue of the limitations of ion mobility characteristics of the electrolyte and thus choke off the reaction at any part of the cathode.

In this invention a two-phase boundary is established between the electrolyte and the surface of the cathode, and the only contact between the gas to be tested and the cathode surface is by diffusion of the gas through the electrolyte in a direction transverse to the two-phase boundary. The oxygen reaching that boundary is catalytically reacted with the electrolyte at a nearly uniform rate over this entire surface area of the exposed area of the cathode, and the electric current produced as a result of that reaction is measured to determine the amount of oxygen in the gas.

In FIG. 5 there is shown a graph indicating how the output current I of the cell varies as a function of the height of the part of the cathode which lies above the upper surface of the electrolyte when the gas in the upper part of the cell contains a fixed concentration of oxygen. Here it will be noted that the output current is a linear function of the area of the cathode that lies above the electrolyte up to a predetermined height. When the cathode height is zero, that is, when the upper edge of the cathode lies slightly below the upper surface of electrolyte, there is a slight output, thus accounting for the positive intercept of the graph with the output current axis I. It is also to be noted that when the height of the cathode exceeds a certain amount $h_0$, the output current no longer continues to increase as a linear function of the height. Graphs $G_1$ and $G_2$ respectively represent data obtained with a cathode in the form of an imperforate metal sheet and one in the form of a double wire mesh screen. It is to be noted that the critical height is not so definite with a screen and in fact that when a screen cathode is used the critical height is greater than when a sheet metal cathode is used.

Examination of cathodes with a microscope or even visually by specular reflection while the cathodes are in satisfactory operating condition, shows that when the height of the cathode is less than the critical height $h_0$, the entire cathode is visibly wet, and that even when the height of the cathode is greater than the critical value $h_0$, a portion of the cathode above the height $h_0$ also appears wet. It may be that under some conditions a very thin film of moisture covers the uppermost part of the cathode, which sometimes appears dry, but the thin film on this part of the cathode is of such a character that no reaction occurring there contributes substantially to the current output of the cell. Nevertheless, without intending to be bound by any specific details of a theory of operation, it appears that the tapering off, or saturation, and irregularity in the output that occurs when the height is greater than the critical height, is accounted for by the fact that the critical height actually fluctuates, depending somewhat upon the prior history of the cell, the rate of flow of the test gas, the temperature of operation, and upon other factors, and that in any event the rate of reaction is limited by the ion mobility of the electrolyte. Regardless of the exact explanation for the irregularity involved, it has nevertheless been found that by establishing the height of the cathode at a value such that the entire cathode acts catalytically, then, under a wide variety of conditions of operation, high sensitivity and accurate reproducibility are achieved.

In accordance with this invention, the height of the cathode is made less than the critical height up to which the output of the cell is approximately a linear function of height. For practical purposes the output is considered linear if the departure from linearity is no more than about 3% at any point over the range of operation. In this invention, even though the cathode extends above the electrolyte, the entire or substantially the entire surface of the cathode is visibly wet. Furthermore, to preserve such linearity, the height of the film is such that the entire cathode is catalytically active. In such a case the thickness of the film is such that the material in the film is in a truly movable liquid form and the formation of ions at the cathode is not limited by the ion mobility at any point spaced therefrom. Also in such a case the film is maintained in liquid contact with the body of electrolyte by means of liquid channels in which the ion concentration does not limit the formation of ions in the film prior to the time that it is limited by the rate of reaction at the cathode surface.

The cathode is composed of a material that catalyzes the reduction of oxygen and which, for convenience, is termed here a depolarizing metal. Two principal types of depolarizing metals are suitable for use in this invention. One type consists of metals that tend to form reactive oxides on their surfaces, such as those that are formed in the presence of oxygen when copper or silver are visibly wetted by an aqueous alkaline solution, such as a solution of caustic, that is, caustic soda (sodium hydroxide) or caustic potash (potassium hydroxide). The other type is one in which the metal tends to form a hydride, as is the case when a platinum, nickel, iridium, or gold electrode is wetter either by an salkaline solution, or by a neutral salt solution, or by an acid. These metals have low work-functions and form face-centered cubic crystals in which the interatomic distances approximate the interatomic distances of molecular oxygen.

Silver is more satisfactory than copper where rapid indications of large changes in oxygen concentration are required. Platinum provides the most sensitive system and it is suitable where a hydrogen-free gas mixture of low oxygen concentration is undergoing analysis.

In the best embodiment of the invention the cathode may be formed of mesh wire made of the selected metal; or the cathode may be made by employing a wire mesh on the basis of its mechanical properties and completely plating it with a selected metal. Thus, for example, wire mesh of pure copper, silver, platinum, nickel, and gold is available, and a wire mesh of one of those metals may be used; or Monel metal mesh or brass or copper or stainless steel mesh may be plated with a different metal selected from the group consisting of copper, silver, platinum, nickel, iridium or gold.

At the cathode the following overall reaction occurs:

In the case of copper this reaction involves two intermediate reactions, namely:

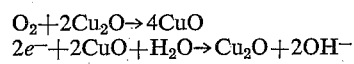

In the case of silver the intermediate reactions are:

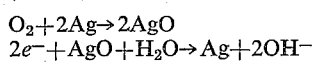

Similar sets of equations can be written for the hydride-producing systems. Thus, these cathodes are catalytically functioning metals and are non-consumable under the existing cell operating conditions.

In any event, the anode is composed of a material which is electrolytically oxidized in the electrolyte so that the products formed at the cathode can be readily removed at the anode. In addition, the anode is composed of a conducting material that does not liberate hydrogen when immersed in the electrolyte. Thus, lead, antimony, and cadmium are suitable for use as anodes when an aqueous alkaline solution is used, and copper is suitable for use as an anode in an acid aqueous electrolyte.

Regardless of what type of catalyst is used and regardless of whether it is used in an acid, a neutral, or an alkaline solution, when oxygen is flowing through the cell, a current between the electrodes is produced by virtue of the catalytic reduction, or hydrogenation, of the oxygen that reaches the surface of the cathode and the migration of the reduction product downwardly through the thick liquid film into the main body 42 of the mother electrolyte and eventually to the anode 24. By employing a cathode covered with such a film, a cell is produced which has a greater range, greater linearity, and greater reliability and uniformity than if the upper part of the cathode were dry or were coated with only a thin film of electrolyte.

It has been found that —50 mesh screen, or finer, is satisfactory, as described in more detail below. A copper electrode has also been found to be satisfactory and is especially useful in demonstrating the existence of the critical height and in demonstrating the importance of maintaining the cathode catalytically active over its entire exposed surface.

The cathode has been arranged, as illustrated in FIGS.

1, 2, and 3, with a small portion of the cathode at the lower edge immersed in a twenty-percent-by-weight potassium hydroxide electrolyte. Various anodes have been used and have been found to operate successfully, and lead is very satisfactory. The analyzing cell described hereinabove in connection with FIGS. 1, 2, 3, and 6 is best made with silver mesh for the cathode, lead for the anode material, and twenty percent potassium hydroxide as the electrolyte.

In assembling an electrolytic cell employing a strip of copper sheet as a cathode, it is found that if the height of the upper edge of the cathode above the surface of the electrolyte is greater than the critical height $h_0$, the copper cathode displays three differently colored characteristic zones. The upper portion of the cathode is black, indicating that the copper exists there in the form of cupric oxide (CuO). Between this black zone and the upper surface of the electrolyte, the copper exhibits a pinkish zone indicating that the copper exists in this portion as cuprous oxide ($Cu_2O$). A third zone appears on the cathode beneath the upper surface of the electrolyte. This portion of the cathode has a metallic copper luster. Examination of the cathode indicates that it is visibly wet in both the pink and black zones.

Tests with a copper electrode which displays both a black zone and a pink zone lead to unsatisfactory results. The current indications produced with such an electrode structure are not accurately reproducible. Furthermore, tests with such a structure exhibit a hysteresis or back-lash effect. Such an effect appears as a current output error, for example, when the oxygen concentration is increased gradually and then decreased gradually. For this reason, in accordance with this invention, the height of the copper electrode is made less than the critical height that would otherwise exist between the top surface of the electrolyte and the boundary between the cuprous and the cupric oxides. This critical height is the same as that up to which the output is a linear function of height. The entire part of the cathode below the critical height acts catalytically in generating the output current of the cell while no part of the cathode above the height plays any substantial role in contributing to the output current.

The actual value of the critical height depends somewhat upon the concentration of the oxygen in the gas mixture that is undergoing analysis. For example, in one test that was made with a fresh copper cathode, the critical height was about 2 cm. when the oxygen concentration was 100 p.p.m. and the critical height was about 0.8 cm. when the oxygen concentration was about 5,000 p.p.m. In both cases, however, visual observation indicated that the cathode was visibly wet above the boundary between the cupric oxide and the cuprous oxide.

By maintaining the height of the cathode below the critical height, linearity of the output current as a function of oxygen concentration is attained. By utilizing a cathode of such height, the reaction of the oxygen with the electrolyte occurs at a rate that is substantially proportional to the oxygen concentration and the reaction occurs over the entire active area of the cathode. The fact that such a critical height exists and the fact that a substantially linear relationship exists between the output current and the oxygen concentration may be explained in terms of the reaction rate and ion mobility. When the height of the cathode is below the critical height, the thickness of the film is large enoug to permit the ions produced by the reaction of the oxide to migrate freely through the liquid film. But when the height, the thickness of the film is large enough to perfilm is not of sufficient thickness to permit such free migration. In the former case, the oxygen diffuses through the film to the cathode at such a rate that the rate of production of ions is less than the rate at which the ions can flow freely through the film to the mother electrolyte. Under these conditions, the intermediate product of the catalytic reaction CuO is reduced by the electrolyte to the lower oxide $Cu_2O$. But in the latter case, the ion mobility limits the rate at which ions can flow to the mother electrolyte. For this reason electrolyte becomes saturated at its upper end with OH$^-$ ions thus choking the catalytic reaction and the intermediate product CuO accumulates permanently above the critical height, until such time as the oxygen concentration is reduced and sufficient recovery time has elapsed.

The effect of ion mobility may be explained more fully by taking into account the fact that for any given voltage gradient, the maximum rate of movement of the ions is a constant, known as ion mobility. In the case of a cathode extending a substantial distance above the main surface of the mother electrolyte, the voltage gradient to which the ions formed at the cathode surface are subjected diminishes with the distance of the point of formation from the mother electrolyte. Consequently, at each height, a corresponding maximum rate of withdrawal of ions exists. This rate of withdrawal diminishes with height above the mother electrolyte. Under such circumstances, it is clear that if the rate of diffusion of oxygen through the film is such that the rate of formation of ions is low, all of these ions will migrate freely from the film to the mother electrolyte. But above the critical height, the rate of diffusion of oxygen to the cathode is so great that the higher metallic oxide $CuO_2$ is formed there at a rate too fast to permit reconversion of that higher oxide into an oxide of lower form and into hydroxyl ions that can migrate freely to the mother electrolyte.

Even though the line of demarcation is not so vivid when other cathode materials are employed, the same requirement of maintaining the entire cathode acting catalytically during operation applies to them too.

In this invention, a two-phase boundary is maintained between the electrolyte and the entire surface of the cathode. The formation of a three-phase boundary between the gas, the electrolyte, and the cathode is prevented. As a result, the only path of communication of gas to the cathode surface is by diffusion of gas through the film along paths that are transverse to the exposed film surface at that surface and are transverse to the two-phase boundary at the cathode.

In one form of silver cathode that has been employed, the cathode was formed from a —80 mesh screen having a length of 25 cm. and a width of 2 cm. The sheet was folded lengthwise to form an electrode 25 cm. long and 1 cm. wide. In this arrangement, the fold was pressed to insure intimate contact between the two halves of the cathode, as indicated in FIG. 6. The strip was then folded into the W or zig-zag configuration as illustrated in the drawings and as described above. Terminals 34 were then welded to the outer parts of the cathode, and the cathode was mounted in place in the cell 10.

When the cell has been assembled and is to be used, electrolyte is added to the cell through a filler port 46 in the cover plate. As indicated previously, the quantity of electrolyte added is sufficient to permit the electrolyte to cover the lower edge of the cathode. If desired, the cell can be manipulated to accelerate wetting of the cathode. However, this is not necessary, as capillary action causes a portion of the electrolyte to rise and to cover the entire surface of the cathode thereby forming a thick film of freely movable liquid over all portions of the cathode on the outer sides thereof that are exposed most directly to the gas to be tested, leaving no part of the cathode dry. Though not absolutely required, the bushings 36 preferably extend to the upper edge of the cathode thus blocking the formation of any three-phase boundary whatsoever. In this way not even a small dry part of the cathode terminals is exposed directly to the gas flowing through the cell.

With this arrangement, a capillary reservoir is formed between the two halves of the screen thus making it possible to wet the silver cathode to a greater height and to maintain the film thicker on the exposed side of the cathode than if only a single sheet of screen was employed. The electrolyte fills the apertures of the screen and the space between the two layers of screen thus providing channels of communication of freely movable liquid between the film on the outer surfaces of the screen and the main body of the electrolyte. These channels are so wide in relationship to the height of the cathode that no ion current saturation occurs there to choke the reaction at the cathode surface. As a result, the entire cathode surface acts catalytically. With such an arrangement, ions formed by reaction of the oxygen in the film are able to flow freely from the film to the main body of the electrolyte. Because of the channel reservoir, the minimum film thickness on all filaments of the cathode is about the same at all elevations above the mother electrolyte. With this arrangement the oxygen concentration for which ion mobility saturation occurs on a cathode filament is the same at all such elevations and ion mobility saturation occurs in the film before it occurs in the reservoir channel.

It is emphasized that the proper operation of the cell is based upon the ability of the metal mesh, of which the cathode is composed, to imbibe liquid by capillary action. It has been found that openings in the wire mesh used should not be greater in width or length than about 0.01 inch, that is, about 10 mils. For wire mesh of the U.S. standard screen scale size, this corresponds to —60 mesh screen, for which the wire diameter is 6.4 mils. It will be appreciated, however, that a slightly coarser mesh than —60 mesh may be used if the wire thickness is correspondingly greater. The screen openings may be much finer than 10 mils, and, from a practical standpoint, the lower limit of screen size opening is actually set by the commercial availability of woven wire screens in very fine sizes rather than by any operating limits. By use of such a screen the film shape on the cathode filaments is the same and its thickness is greater than it would be if the screen were merely in contact with a wick such as a piece of filter paper extending into the electrolyte from a cathode supported above the electrolyte.

When a piece of screen of the type described having a screen opening of less than 10 mils, is immersed in an electrolyte, it soaks up the electrolyte by capillary action and becomes completely wetted visibly with a film of electrolyte. This mode of saturation with liquid extends to a height of at least 1 cm. with ordinary aqueoue electrolytes for the coarsest screen type described hereinabove as usable, and substantially more than 1 cm. in height for finer screens. It has been found that it is particularly advantageous to use a double screen produced by folding as has been described, with the fold at the top, all as appears from FIGS. 3 and 6. This construction is especially desirable because of the increased film thickness attained and because of the wide channel for ion flow provided by the reservoir between the two parts of the double screen. However, a single thickness of screen 31 can be used, as indicated by the cross-section shown in FIG. 7, while still retaining many of the advantages of the invention.

The appearance of a screen in contact with the electrolyte as described, and therefore saturated or soaking wet with the electrolyte, is striking when examined by a low-power microscope or high-quality hand lens. When so examined it is observed that the surfaces of the screen are visibly coated with liquid. In general, the apertures of the screen are filled with liquid, and wherever two wires are adjacent the other, curved menisci are very easily seen, especially by reflected light. No part of the cathode metal is dry under the conditions of operation of the device, but the entire surface is visibly wet. Furthermore, the films formed on the wires do not nearly encircle the wires but instead extend only part way around the wires, in fact no more than about 180° around the outer sides of the wires to the point where the films merge by means of the menisci into small pools or bodies of liquid electrolyte that fill the apertures between the wires. These small pools of liquid electrolyte are formed by virtue of the fact that liquid is supported between the wires by the wires themselves. These small pools of electrolyte thus feed the films on the adjacent wires and make them thicker than they would be if the electrolyte did not extend between the wires and fill the apertures. This is very different from the situation that would occur if the wire mesh were placed in contact with only slightly moist filter paper or other wick material which tends to soak up electrolyte from the wire mesh drying the filament on the sides thereof exposed to the gas undergoing analysis or at least forming films of minimal thickness there. Instead, the thickness of the films in this invention are greater than minimal, thus making it possible to measure oxygen concentrations of high value before saturation occurs. In other words, with this invention the linearity range is extended.

The small pools of electrolyte in the mesh openings and the reservoir of electrolyte between the two folds of the double screen cathode provide relatively wide channels of communication between the films and the mother electrolyte. The provision of such channels prevents ion current saturation from occurring in the electrolyte except at the cathode surface itself. For this reason, the range of oxygen concentration over which linearity may be achieved is determined by the film thickness and not by choking of ion flow in the path between the filament and the mother electrolyte. Thus, in the best form of this invention the film through which the gas flows to the cathode is in unchoked liquid communication with the mother electrolyte. In the case of the single layer of screen, the pools of electrolyte in the apertures and at the intersections of the wire provide the channels of communication between the films and the mother electrolyte. It is also possible to practice the invention by laying a flat wire mesh horizontally in the electrolyte with the upper edge of the mesh projecting slightly above the level, or main upper surface of the electrolyte. In this case, too, pools of electrolyte fill the apertures of the screen and the film extends to less than about 180° around the filaments.

In the operation of the cell, it is desirable to flow the gas to be tested through the cell at a rate such that the gaseous content of the cell is changed approximately each minute, that is, if the gas portion of the cell has a volume of 100 cc., a flow rate of 100 cm. per minute is often found advantageous. In order to insure adequate diffusion of the gas to be tested to all portions of the cathode, the aspect ratio of the cathode, that is, the ratio of the width between successive folds 32 of the cathode, as appears from FIG. 3, to the height of the cathode above the electrolyte level, should be at least about 0.5.

In general, the cell may be operated for best results at ordinary room temperatures. It is desirable in some cases, however, to enclose the cell in a thermostated housing, so as to avoid any temperature-dependent variance of output. It is likewise to be understood that the cell is essentially a current cell, and should operate into a low impedance which may be conveniently as low as 10 ohms. If the cell is placed across a very high impedance, such as, say, 10 megohms, then only the voltage produced by the cell will be registered if the oxygen content is above about 25 p.p.m.

It will be appreciated that the reaction which takes place at the cathode surface is one of reduction of oxygen. This is known as a depolarizing action, and for convenience the metals which so operate, a number of which have been specifically disclosed herein, have accordingly been called "depolarizing metals." Of course, the depolarizing action is essentially a catalytic phenomenon, and the metals which have this depolarizing action are not inert but are catalytically active. Except in the case of copper, no pre-treatment of the depolarizing metals is needed, as they readily assume the requisite characteristics when placed in a suitable electrolyte as disclosed. However, where a copper electrode, especially one wet with the electrolyte, has been exposed to a gas containing a high concentration of oxygen, as, for example, air, then it may be necessary to operate the cell for a long time, such as many hours, in an atmosphere containing only a trace of oxygen in order to restore the normal operating conditions of the cathode.

It will be further understood that a gas to be tested may be given various treatments, such as humidification, by first passing through a suitable moisture conditioner or even chemical solutions to scrub it of undesired components while leaving its oxygen content unchanged, or it may be adjusted to some desired temperature or the like. It may even be passed through a trap cooled with solid carbon dioxide or liquid air so as to condense various constituents while again leaving the oxygen content unchanged. In many instances, the gas to be tested will be available under pressure. In this case, no auxiliary apparatus is needed to force the gas to flow through the analyzing cell and any preliminary scrubbers, dehumidifiers, and the like. In other cases it will be found desirable to flow the gas through the analyzing cell by means of a pump. Since such pumps are entirely conventional and well-known in this art, they are not described herein in any greater detail.

It will be appreciated that the invention is a broad one, and that numerous modifications in materials, construction, and operating conditions may be made within the scope of the invention as defined by the claims which follow.

The invention claimed is:

1. In a method for detecting the presence and amount of oxygen in admixture with another gas by means of an electrolytic cell including an electrolyte, a cathode that catalyzes the reduction of oxygen under the cell operating conditions and an anode in contact with electrolyte, the steps which comprise:

establishing a film of electrolyte between a body of said admixture and the surface of the cathode through which film the admixture diffuses to said surface;

blocking the movement of such admixture to said cathode except through electrolyte;

catalytically reacting said oxygen and said electrolyte at the two-phase boundary formed between said electrolyte and said cathode surface to reduce oxygen reaching said surface;

and measuring the current generated by the catalytic action of said cathode on gas diffusing through said electrolyte to said boundary.

2. In a method for detecting the presence and amount of oxygen in admixture with another gas by means of an electrolytic cell including a body of liquid electrolyte, a cathode that catalyzes the reduction of oxygen under the cell operating conditions and an anode, the steps which comprise:

covering the entire surface of said cathode above the upper surface of said electrolyte with electrolyte thus establishing a two-phase boundary between said electrolyte and said cathode;

diffusing gas from said admixture through said electrolyte to said two-phase boundary while preventing any other contact between said gas and said cathode;

catalytically reacting oxygen diffusing to said boundary with said electrolyte to reduce said oxygen;

maintaining all parts of said boundary in unchoked liquid contact with a body of said electrolyte;

maintaining said anode in said body of electrolyte and spaced from said cathode, said anode being a material not liberating hydrogen in the cell; and measuring the current generated by said cathode at said two-phase boundary.

3. A method for detecting the presence and amount of oxygen in admixture with another gas by means of an electrolytic cell including a cathode in contact with an electrolyte therein, which cathode catalyzes the reduction of oxygen by a reaction of oxygen with said electrolyte, which method comprises:

maintaining a visible electrolyte film between any part of the surface of said cathode and the gas mixture to be tested;

maintaining said film in unchoked liquid contact with a body of said electrolyte;

maintaining an anode in said body of electrolyte spaced from said cathode, and measuring the current generated between said cathode and said anode.

4. In a method for detecting the presence and amount of oxygen in admixture with another gas by means of an electrolytic cell including a cathode in contact with an electrolyte therein, which cathode catalyzes the reduction of oxygen by a reaction of oxygen with said electrolyte, the steps that comprise:

maintaining a thick electrolyte film between any part of the surface of said cathode and the gas mixture to be tested;

maintaining said film in unchoked communication with a body of said electrolyte by means of freely movable liquid;

maintaining an anode in said body of electrolyte spaced from said cathode, and measuring the current generated between said cathode and said anode.

5. A method for detecting the presence and amount of oxygen in admixture with another gas which comprises:

maintaining the apertures of a cathode having the form of a wire mesh filled with electrolyte in liquid contact with a body of said electrolyte, said cathode catalyzing the reduction of oxygen under the operating conditions of the cell;

maintaining the remainder of the surface of said cathode that does not form the boundaries of said apertures covered with a film of electrolyte that is joined by menisci with the electrolyte in said apertures;

maintaining said film exposed to the gas to be tested;

maintaining an anode of an electrically conducting material that does not liberate hydrogen when immersed in said electrolyte and which is electrically oxidized in said electrolyte in said body of electrolyte in spaced relationship with said cathode;

and measuring the current generated between said cathode and said anode.

6. A method for detecting the presence and amount of oxygen in admixture with another gas which comprises:

maintaining part of the surface of a cathode of silver, having the form of a wire mesh, covered with a film of freely movable liquid electrolyte of aqueous potassium hydroxide and the remainder of the otherwise exposed surface of said cathode covered with electrolyte, said cathode catalyzing the reduction of oxygen by reaction of oxygen with said electrolyte;

maintaining said film of freely movable electrolyte in liquid contact with a body of said electrolyte;

maintaining said film exposed to the gas to be tested;

maintaining an anode in said body of electrolyte and spaced from said cathode;

and measuring the current generated between said cathode and said anode.

7. A method as in claim 6 wherein the anode is lead.

8. In a method for detecting the presence of free oxygen and determining the amount thereof in a gas mixture, by an electrolytic cell having a body of liquid electrolyte, an anode in said electrolyte, and a cathode in said electrolyte, the steps of:

disposing part only of the surface of said cathode in direct contact with said body of electrolyte, establishing a film of electrolyte over the remaining portion of the surface of the cathode and between a gas mixture in the cell and the cathode surface, thereby establishing a two-phase boundary between said electrolyte and the surface of said cathode while preventing a three-phase boundary from being formed between said cathode, said gas mixture and said electrolyte, and thereby causing said cathode surface to act as a catalyst;

causing said oxygen in said gas mixture to reach said cathode surface by diffusion through said electrolyte and to be fixed as hydroyl ions by catalytic action of said cathode metal;

and measuring the current generated by such catalytic action.

9. A method for detecting the presence and amount of oxygen in admixture with another gas which comprises:

maintaining a cathode composed of a metal chosen from the class consisting of silver, copper, platinum, gold, nickel and iridium, having the form of a wire mesh, covered with a film of freely movable liquid electrolyte establishing a two-phase boundary only between said electrolyte film and said cathode and establishing a catalytic condition for reduction of oxygen diffusing through said film from said gas to said cathode surface;

maintaining the apertures of said mesh filled with electrolyte;

maintaining said film exposed to the gas to be tested;

maintaining an anode of an electrically conducting material that does not liberate hydrogen when immersed in said electrolyte and which is electrically oxidized in said electrolyte in said body of electrolyte in spaced relationship with said cathode;

and measuring the current generated between said cathode and said anode.

10. In a device adapted to the detection of oxygen in admixture with other gases;

a cell capable of holding a liquid;

a body of liquid electrolyte in said cell and forming a gas chamber above the level of the mother liquid electrolyte;

means to introduce a body of gas to be tested in said cell;

a cathode mounted in said cell with a lower portion located in said liquid electrolyte below the level thereof and an upper portion extending above the level of said electrolyte and being exposed to gas in said chamber, the surface of said cathode that is exposed to said gas being coated with a thick film of electrolyte, said liquid film being in liquid communication with said body of electrolyte, said cathode catalyzing the reduction of oxygen diffusing thereto through said film;

an anode in said electrolyte and spaced from said cathode;

and means operatively connected with said anode and said cathode to respond to passage of a current therebetween.

11. In a device adapted to the detection of oxygen in admixture with other gases and including a cell, a body of liquid electrolyte in said cell;

a body of gas to be tested in said cell;

a metal cathode mounted in said cell, said cathode being composed of wire mesh with a lower portion located in said liquid electrolyte below the level thereof and an upper portion extending above the level of said electrolyte and being exposed to gas in said chamber, the sides of said cathode exposed to said gas being coated with films of electrolyte, the apertures of said mesh being filled with electrolyte, said cathode catalyzing the reduction of oxygen diffusing thereto through said film;

an anode in said electrolyte and spaced from said cathode;

and means operatively connected with said anode and said cathode to respond to passage of a current therebetween.

12. In a device adapted to the detection of oxygen in admixture with other gases and including a cell, a body of liquid electrolyte in said cell;

means to introduce a body of gas to be tested in said cell above the level of said electrolyte;

a metal cathode mounted in said cell and extending into said body of electrolyte and into the gas space above said body of electrolyte, said cathode being composed of wire mesh, the height of said cathode being such that electrolyte fills all the apertures by capillary attraction of said mesh drawing said electrolyte upwardly from said body of electrolyte, the surface of said cathode being coated with a film of electrolyte, said cathode catalyzing the reduction of oxygen diffusing thereto through said film;

an anode in said electrolyte and spaced from said cathode;

and means operatively connected with said anode and said cathode to respond to passage of a current therebetween.

13. In a device adapted to the detection of oxygen in admixture with other gases and including a cell, a body of liquid electrolyte in said cell;

means to introduce a body of gas to be tested in said cell above the level of said liquid electrolyte;

a metal cathode mounted in said cell, and extending into said body of electrolyte and into the space above said level of said liquid electrolyte, said cathode consisting of wire mesh, the height of said cathode being such that electrolyte fills all the apertures of said mesh and forms a liquid film on the exposed surfaces of said wire mesh by capillary atraction of said mesh, said cathode catalyzing the reduction of oxygen diffusing thereto through said film;

an anode in said electrolyte and spaced from said cathode;

and means operatively connected with said anode and said cathode to respond to passage of a current therebetween.

14. In a device adapted to the detection of oxygen in admixture with other gases and including a cell;

a body of liquid electrolyte in said cell;

means to supply a body of gas to be tested in said cell;

a metal cathode mounted in said cell, and extending into said body of electrolyte, said cathode being composed of two contacting layers of wire mesh, the height of said cathode being such that electrolyte fills the apertures of said mesh and the space between said layers and forms an electrolyte film covering the outer surfaces of said wire mesh by capillary attraction drawing said electrolyte upwardly between said layers and into said apertures, said cathode catalyzing the reduction of oxygen in said electrolyte;

an anode in said electrolyte and spaced from said cathode;

and means operatively connected with said anode and said cathode to respond to passage of a current therebetween.

15. In a device adapted to the detection of oxygen in admixture with other gases and including a cell;

a body of liquid electrolyte in the lower portion of said cell;

means to supply a body of gas to be tested in said cell;

a metal cathode mounted in said upper portion of said cell, the surface of said cathode being coated with a thick film of electrolyte that is in unchoked communication with said body of electrolyte;

said metal being selected from the group consisting of platinum, nickel, iridium and gold and consisting of silver and copper when said electrolyte is alkaline, said cathode catalyzing the reduction of oxygen under the operating conditions of the cell;

an anode in said electrolyte and spaced from said cathode;

and means operatively connected with said anode and said cathode to respond to passage of a current therebetween.

16. In a device adapted to the detection of oxygen in admixture with other gases and including a cell;

a body of liquid electrolyte in said cell;

means to supply a body of gas to be tested in said cell;

a cathode mounted in said cell, the entire surface of said cathode being wet, said cathode catalyzing the reduction of oxygen thereby contributing to the current generated by said cell;

an anode in said electrolyte and spaced from said cathode;

and means operatively connected with said anode and said cathode to respond to passage of a current therebetween.

17. In a device adapted to the detection of oxygen in admixture with other gases, a cell capable of holding a liquid;

a liquid alkali metal hydroxide electrolyte in said cell;

means to supply a gas to be tested in said cell;

a cathode composed of a metal chosen from the class consisting of silver, copper, platinum, gold, nickel and iridium and having the form of a wire mesh, the entire cathode being in free liquid contact with said electrolyte, all the wires of said cathode being covered with a film of liquid electrolyte, said cathode catalyzing the reduction of oxygen diffusing thereto through said film;

an anode of an electrically conducting material that does not liberate hydrogen when immersed in said electrolyte and which is electrically oxidized in said electrolyte, said anode being in said electrolyte and spaced from said cathode;

and means operatively connected with said anode and said cathode to respond to passage of a current therebetween.

18. In a device adapted to the detection of oxygen in admixture with other gases, a cell capable of holding a liquid;

a liquid electrolyte in said cell;

means supplying a gas to be tested in said cell;

a cathode composed of a metal chosen from the class consisting of silver and copper and having the form of a wire mesh, said cathode being covered with a film of liquid electrolyte, said electrolyte being an alkaline metal hydroxide, said cathode catalyzing the reduction of oxygen diffusing thereto through said film;

an anode of an electrically conducting material that does not liberate hydrogen when immersed in said electrolyte;

said anode being in said electrolyte and spaced from said cathode;

and means operatively connected with said anode and said cathode to respond to passage of a current therebetween.

19. In a device adapted to the detection of oxygen in admixture with other gases;

a cell capable of holding a liquid;

a liquid electrolyte consisting of aqueous potassium hydroxide in said cell;

means to supply a gas to be tested in said cell to a chamber above the main upper surface of said electrolyte;

a cathode composed of a metal chosen from the class consisting of silver and copper and having the form of a wire mesh, said cathode being covered with a film of liquid electrolyte, said film and said cathode above said surface of said electrolyte providing only a two-phase boundary between them, said cathode catalyzing the reduction of oxygen diffusing thereto through said film;

an anode of an electrically conducting material that does not liberate hydrogen when immersed in said electrolyte, said anode being immersed in said electrolyte and spaced from said cathode;

and means operatively connected with said anode and said cathode to respond to passage of a current therebetween.

20. In a device adapted to the detection of oxygen in admixture with other gases, a cell capable of holding a liquid;

a liquid electrolyte of aqueous potassium hydroxide in said cell;

means to supply a gas to be tested in said cell above the main upper surface of said electrolyte;

a silver cathode having the form of a wire mesh, said cathode being in free liquid contact with said electrolyte, said cathode being covered with a film of liquid electrolyte, said cathode catalyzing the reduction of oxygen diffusing thereto through said film;

a lead anode in said electrolyte and spaced from said cathode;

and means operatively connected with said anode and said cathode to respond to passage of a current therebetween.

21. In an electrolytic cell adapted for detecting the presence and amount of oxygen in admixture with other gases:

a cell;

a body of liquid electrolyte in said cell;

means to supply a body of gas to be tested in said cell above the level of said body of liquid;

a metal cathode mounted in said cell, said cathode catalyzing the reduction of oxygen in said electrolyte, at least a part of said cathode being above the main surface of said body of liquid electrolyte, the height of the uppermost part of said cathode being such that a liquid film separates all of the surface of said cathode above said liquid level from said body of gas whereby the only means of communication of said gas and said cathode is by diffusion of said gas through said film in a direction transverse to the surface of said cathode, there being only a two-phase boundary without any three-phase boundary between said gas, said electrolyte, and said cathode;

an anode in said body of electrolyte and spaced from said cathode;

and means operatively connected to said anode and said cathode for measuring the current generated therebetween by the catalytic reaction of said oxygen and said electrolyte at the two-phase boundary formed between said electrolyte and the surface of said cathode.

22. In an electrolytic cell adapted to the detection and measurement of free oxygen mixed with other gases, a cell capable of holding a liquid;

a body of liquid electrolyte in said cell and a gas chamber provided in the cell above the level of the liquid electrolyte;

means for supplying into said chamber in said cell a body of gas to be tested;

a metal cathode mounted in said cell with the lower portion immersed in said body of liquid electrolyte beneath the level thereof and providing an upper catalytic surface disposed above said level of the liquid electrolyte, all the otherwise exposed surface of the cathode above said liquid level being covered with electrolyte by capillary attraction, the electrolyte on such cathode surfaces being in unchoked liquid communication with said body of electrolyte, said cathode serving as a catalyst to reduce oxygen diffusing through said films;

an anode in said body of electrolyte and spaced from said cathode and being free from hydrogen-liberating characteristics under cell conditions;

and means for measuring current generated between said cathode and said anode.

23. An electrolytic detection cell as in claim 22 wherein said cathode provides an ion flow channel filled above said liquid level with electrolyte by capillary attraction.

24. A cell as in claim 23 wherein said channel is provided by a folded metal screen constituting said cathode.

25. In a device adapted to the detection of oxygen in admixture with other gases and including a cell,
a body of liquid electrolyte in said cell;
a body of gas to be tested in said cell above said body of electrolyte;
a metal cathode mounted in said cell and spaced from the walls thereof, part of said cathode being above and part below the main level of the body of electrolyte, said cathode catalyzing the reduction of oxygen by reaction with said electrolyte, said cathode being composed of two substantially coextensive contacting layers of wire mesh, the height of said cathode above the main level of said body of electrolyte being such that electrolyte fills the apertures of said mesh and also the space between said layers by capillary attraction drawing said electrolyte upwardly from said body of electrolyte into the space between said layers and into said apertures, the outer sides of said wire mesh facing the gas in said cell being coated with films of electrolyte;
an anode in said electrolyte and spaced from said cathode;
and means operatively connected with said anode and said cathode to respond to passage of current therebetween.

26. In a device as defined in claim 25, in which the space between said two contacting layers of wire mesh is substantially free of any obstruction from solid foreign bodies whereby the liquid electrolyte therebetween forms an unobstructed liquid flow channel leading from the electrolyte film on the outer parts of said cathode to the main body of electrolyte.

27. In a device adapted to the detection of oxygen in admixture with other gases and including a cell,
a body of liquid electrolyte in said cell;
a body of gas to be tested in said cell above the body of electrolyte;
a metal cathode mounted in said cell and spaced from the walls thereof, part of said cathode being above and partly below the main level of the electrolyte, said cathode catalyzing the reduction of oxygen by reaction with said electrolyte, said cathode being composed of wire mesh, the height of said cathode above said main level of said body of electrolyte being such that electrolyte fills the apertures of said mesh by capillary attraction drawing said electrolyte upwardly from said body of electrolyte into said apertures, the outer sides of said wire mesh facing the gas in said cell being coated with films of electrolyte;
an anode in said electrolyte and spaced from said cathode;
and means operatively connected with said anode and said cathode to respond to passage of current therebetween.

References Cited in the file of this patent

UNITED STATES PATENTS

| | | |
|---|---|---|
| 2,156,693 | Jacobsen | May 2, 1939 |
| 2,651,612 | Haller | Sept. 8, 1953 |
| 2,805,191 | Hersch | Sept. 3, 1957 |